(12) United States Patent
Stoddard et al.

(10) Patent No.: US 7,421,314 B2
(45) Date of Patent: Sep. 2, 2008

(54) METHOD AND DEVICE FOR CONTROLLING ROBOT

(75) Inventors: Kenneth A. Stoddard, Rochester, MI (US); David Martin, Oakland Township, MI (US)

(73) Assignee: KUKA Roboter GmbH, Augsburg (DE)

(*) Notice: Subject to any disclaimer, the term of this patent is extended or adjusted under 35 U.S.C. 154(b) by 757 days.

(21) Appl. No.: 10/981,278

(22) Filed: Nov. 4, 2004

(65) Prior Publication Data
US 2005/0125100 A1 Jun. 9, 2005

(30) Foreign Application Priority Data
Nov. 5, 2003 (DE) ................. 103 51 670

(51) Int. Cl.
*G06F 19/00* (2006.01)
(52) U.S. Cl. ............ 700/245; 700/246; 700/247; 700/248; 700/249; 700/250; 700/251; 700/252; 700/253; 700/254; 700/255; 700/256; 700/257; 700/258; 700/259; 318/568.11; 318/568.12; 318/568.13; 318/568.14; 318/568.15; 219/121.61; 219/121.62; 219/121.63; 219/121.64; 219/125.11; 901/2; 901/8; 901/9; 901/16; 901/23
(58) Field of Classification Search .......... 700/245, 700/246, 247, 248, 249, 250, 251, 252, 253, 700/254, 255, 256, 257, 258, 259; 219/121.61, 219/121.62, 121.63, 121.64, 125.11, 125.12; 318/568.11, 568.12, 568.13, 568.14, 568.15, 318/568.16, 568.17; 901/1, 2, 16, 8, 9, 23
See application file for complete search history.

(56) References Cited

U.S. PATENT DOCUMENTS 4,260,319 A * 4/1981 Motoda et al. ............ 414/591
4,826,392 A   5/1989 Hayati
4,975,856 A   12/1990 Vold et al.
6,070,109 A * 5/2000 McGee et al. ............ 700/259
6,317,651 B1  11/2001 Gerstenberger et al.

(Continued)

FOREIGN PATENT DOCUMENTS

GB   2 232 504   12/1990

(Continued)

OTHER PUBLICATIONS

Hang, The unified formulation of constrained robot systems, 1988, IEEE, p. 1590-1592.*

(Continued)

*Primary Examiner*—Khoi H. Tran
*Assistant Examiner*—McDieunel Marc
(74) *Attorney, Agent, or Firm*—McGlew & Tuttle, P.C.

(57) ABSTRACT

A method for controlling a robot during an interpolation of a trajectory or motion to any prescribed position, comprises the steps of a) ignoring at least one of the three originally prescribed or interpolated tool center point orientation values; b) finding new tool center point orientation values that place the wrist center point of the robot closest to its base while c) maintaining the originally prescribed or interpolated tool center point location values and d) maintaining the original prescribed or interpolated tool center point orientation values not ignored. Said method can preferably be used for carrying a load with a plurality of robots. Its main advantage is an increase of the available working volume.

18 Claims, 9 Drawing Sheets

U.S. PATENT DOCUMENTS

| | | | |
|---|---|---|---|
| 6,356,807 B1 * | 3/2002 | McGee et al. | 700/253 |
| 6,434,449 B1 * | 8/2002 | De Smet | 700/254 |
| 6,804,580 B1 | 10/2004 | Stoddard et al. | |
| 6,845,295 B2 * | 1/2005 | Cheng et al. | 700/245 |
| 7,110,859 B2 * | 9/2006 | Shibata et al. | 700/245 |
| 7,209,802 B2 * | 4/2007 | Jerregard et al. | 700/245 |
| 7,292,910 B2 * | 11/2007 | Gmeiner | 700/245 |
| 2002/0120363 A1 | 8/2002 | Salisbury et al. | |
| 2002/0192058 A1 | 12/2002 | Harsch et al. | |
| 2003/0171847 A1 | 9/2003 | Cheng et al. | |

FOREIGN PATENT DOCUMENTS

| | | |
|---|---|---|
| JP | 07020915 | 1/1995 |

OTHER PUBLICATIONS

Nguyen et al., Multi-robot control for flexible fixtureless assembly of flexible sheet metal auto body parts, 1996, IEEE, p. 2340-2345.*

Pagilla et al., Adaptive control of two robot arms carrying an unknown object, 1995, IEEE, p. 597-602.*

* cited by examiner

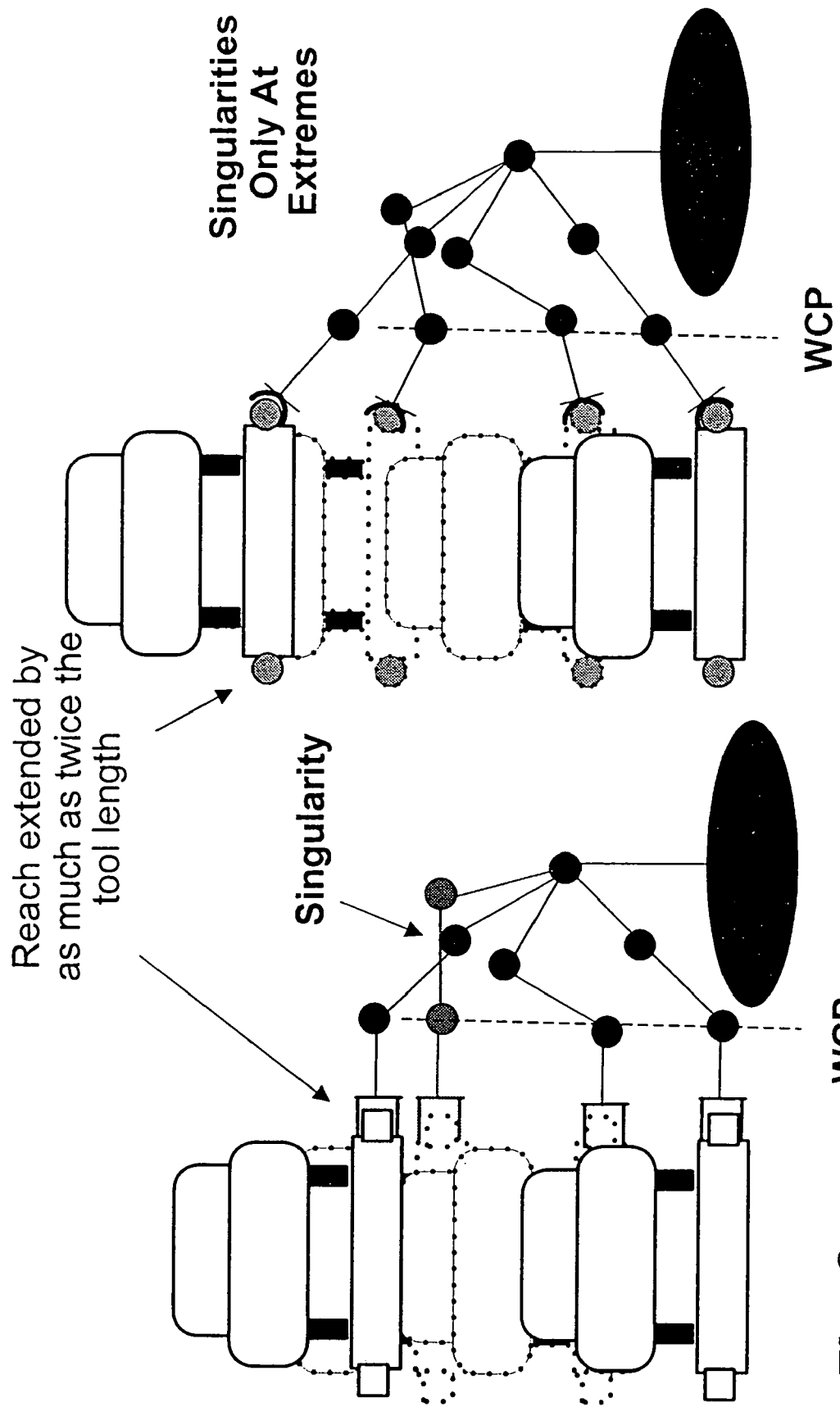

Rigid Grip
Standard 6DOF Interpolation
Hinge Grip
Minimum Extension Interpolation
Fig. 7a
Fig. 7c
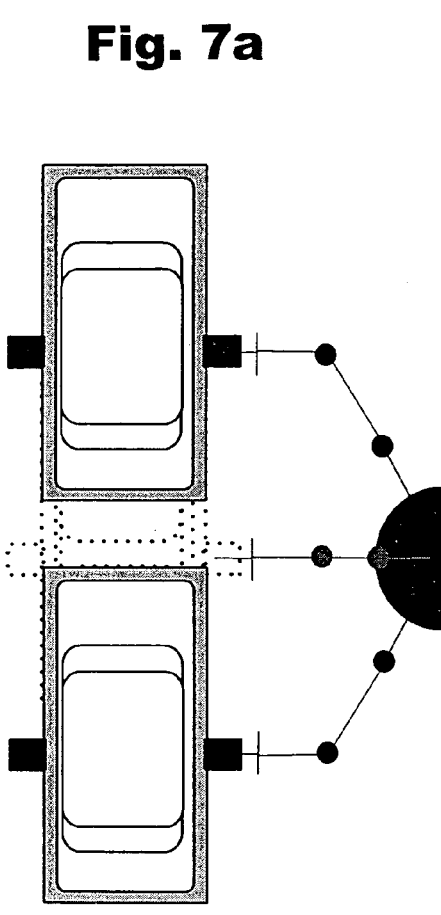
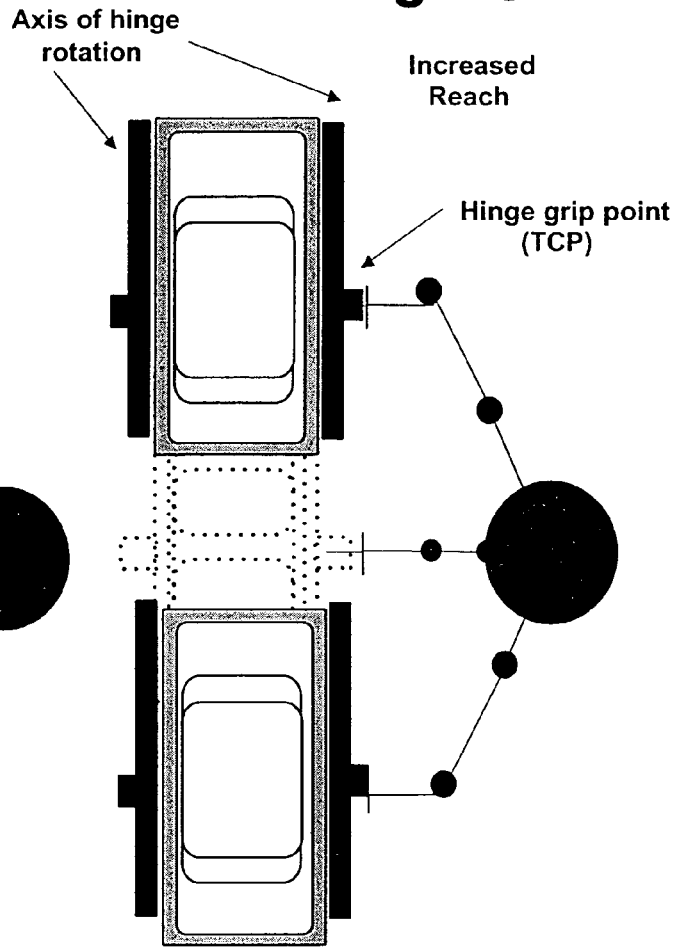
Axis of hinge rotation
Increased Reach
Hinge grip point (TCP)
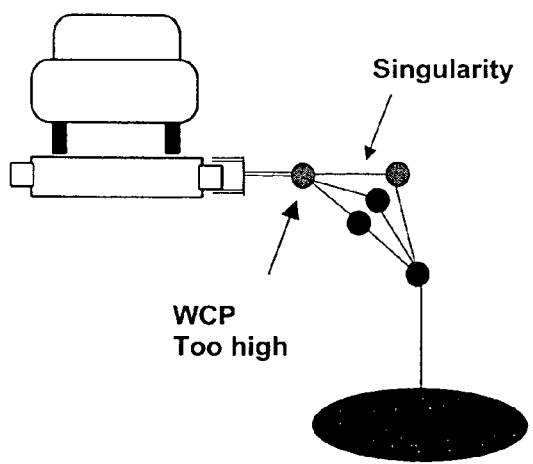
Singularity
WCP Too high
Fig. 7b
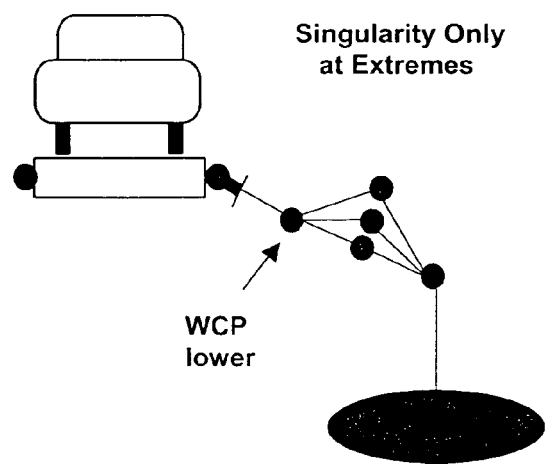
Singularity Only at Extremes
WCP lower
Fig. 7d

METHOD AND DEVICE FOR CONTROLLING ROBOT

BACKGROUND OF THE INVENTION

The invention relates as well to a method and a device for controlling at least one robot as to a method and a device of carrying a load with more than one robot.

It is known that in some cases, when two or more robots carry a part (load sharing), the total working volume may be reduced for the part over that achievable by carrying the part with a single robot. This is because the robots can interfere with each other in various orientations of the part, and because the two or more robots are not located in the same place. Therefore, a trajectory that is achievable by one robot is sometimes not also achievable by the others.

At the same time it is well known that the dexterous working volume of a robot (the volume in which all orientations can be reached) is usually less than the non-dexterous working volume.

Orientation of the part in load sharing is dictated by only the location of the grip points of the individual robots. The term "location" refers to the 3 vector representing the x, y, and z coordinates of an object relative to some frame of reference. The term "orientation" refers to the 3 rotations of an object about the x, y, and z axes relative to some frame of reference. The position of an object in space includes both its location and its orientation and accordingly the term "position" refers to the combination of both location and orientation. It takes 6 numbers to represent the position of an object in space, 3 representing location and 3 representing rotations about.

When an object is floating in space it is "free" to move in all 6 directions; it has 6 Degrees of Freedom (DOF) of motion. When a robot grasps that object with a standard gripper, it normally constrains its motion in all 6 DOF.

The attempt by more than one individual robots to also orient the part is over-constraining. That is, two robots grasping a part may break the part or themselves, because they each try to fix all 6 DOF.

There are several different kinds of singular positions that robots can move to, but here the primary interest is the kind of singular position in which the robot looses 1 DOF of control and at the same time has an infinite number of solutions for that position. One very common example is any position in which the wrist axes are arranged so that the axes of rotation of two joints are collinear. At such a point there are an infinite number of values of one of the two joints for which there is an opposite value taken by the other joint, such that the TCP maintains exactly the same position. This also means that there is an axis of rotation about which the robot no longer can move. It has lost that DOF of control.

When a robot moves very near such a singularity, at least two of the wrist joints must turn very fast in order for the TCP to move even very slowly. Usually, if trying to keep constant TCP speed, the wrist joints will try to move faster than their limits, and the TCP either has to slow down, or the robot must leave the desired trajectory, or the robot just stops because of a speed limit error.

The problem is even more disastrous when two or more robots are carrying the same part and one of them moves near a singular position. It will have to slow down or stop, so the others must also slow down or stop EXACTLY the same way. This is difficult to do in such a way that there is no strain on the part. For example, if two robots are carrying a bucket of water, even if the bucket can be slowed down without breaking, water will certainly slosh out of the bucket!

When two or more robots carry a shared load AND their orientation is fixed with respect to the load, the working volume of the coordinated group is sometimes reduced from that which a single robot carrying the same load would have. This is because the robots can interfere with each other in various orientations of the part, and because the robots are not located in the same place. That is, in some sense the part may only move about in the intersection of the working volumes of the robots sharing the load.

Also, when two or more robots carry the same part, with each robot trying to fix all 6 DOF of the part, the part is over-constrained in position. This is the current state-of-the art in load sharing.

There is a need both to increase the available working volume in load sharing and to reduce the over-constraint situation.

Also, since there are twelve DOF available between two robots carrying a part (or 18 DOF if three carry a part), then it should be possible to have redundant DOFs, so that singularities can be avoided.

Taking in consideration on the foregoing the main objects of the invention are to increase the available working volume, because each robot can make more use of its non-dexterous volume and to reduce stress in the part and in the robots due to over-constraining. A further object is avoiding singularities.

SUMMARY OF INVENTION

These objects are achieved by a method for controlling a robot during the interpolation of a trajectory or motion to any prescribed position, comprising the steps:
a) ignoring at least one of the three originally prescribed or interpolated tool center point orientation values,
b) find new TCP orientation values that place wrist center point of the robot closest to its base while
c) maintaining the originally prescribed or interpolated tool center point location values and
d) maintaining the original prescribed or interpolated tool center point orientation values not ignored as well as by a system for controlling a robot by using during the interpolation of a trajectory or motion to any prescribed position, being designed
a) to ignore at least one of the three originally prescribed or interpolated tool center point orientation values,
b) to find new tool center point orientation values that place the wrist center point of the robot closest to its base while
c) maintaining the originally prescribed or interpolated tool center point location values and
d) maintaining the original prescribed or interpolated tool center point orientation values not ignored.

According to a preferred embodiment the tool center point orientation values according to step b) are determined by an extent minimization algorithm.

Furtheron the invention includes a method and a system of carrying a load with at least two robot, such that the attachment of one robot to the load is via a universal joint, a ball and socket joint or a hinge joint. Is this way the invention proposes a new way for multiple robots to grasp and move an object.

The orientation may be free to rotate about all three axes or be constrained in one degree of freedom, but be free to rotate about two axes, or it may be constrained in two degrees of freedom, but free to rotate about a single axis, such that in either case the free axes/axis can be ignored according to said step a).

Accordingly the means used may advantageously be a ball and socket joint, a hinge joint or a universal joint.

Furthermore the invention relates to a method of carrying a load with at least two robots, such that an attachment of at least one robot to the load is via a universal joint, wherein controlling at least one of said robots during interpolation of a trajectory comprises:
a) ignoring at least one of the three originally prescribed or interpolated tool center point orientation values,
b) finding new tool center point orientation values that place the wrist center point of the robot closest to its base while
c) maintaining the originally prescribed or interpolated tool center point location values and
d) maintaining the original prescribed or interpolated tool center point orientation values not ignored.

Alternatively, according to further developments of the aforementioned inventive method, the attachment of at least one robot to the load is via a hinge joint or a ball and socket joint. In this way, the invention combines some of the advantages pointed out above.

Removing the requirement for one or more DOF of orientation control also frees at least one DOF for redundant solutions for each robot, meaning a robot is free to reach a given location in more than one way (using an arbitrary orientation). This can be used to help avoid singularities in load sharing.

The problem of singularities is alleviated by using a trajectory that follows the desired location, but permits orientation to deviate, so that the singularity position can be avoided. Such is the nature of this invention. Relaxing the orientation requirement of each robot gives the triple benefit of 1) increasing each robot's range (by permitting use of non-dextrous workspace), 2) Reducing overconstraints on the part, and 3) Reducing the need to move robots near singular positions.

By relaxing the orientation requirement of each robot, according to the invention, the working volume of that robot is increased (by permitting it to move into non-dexterous areas of its working volume) and the over-constrained situation with the part is reduced. Though this does not remove interference between robots in all cases, it may reduce the interference regions by permitting the robots to reach their grip points in different orientations.

Though the invention is advantageously used with two or more robots sharing loads there are cases outside of load sharing where orientation is not important, and a single robot moving a part by itself can benefit from extended working volume and singularity avoidance. An example would be dropping a part into a bin, where it is only important to locate the part over the bin. It does not need to be oriented.

In the art, the algorithm used to solve for the joint angles of a robot given the TCP position is called the inverse solution. The inverse solution algorithm is commonly used to evaluate the joint angles to be used to reach any prescribed Cartesian position, including the interpolated positions used in moving along a Cartesian trajectory, such as a straight line or circle.

According to the invention, the prescribed Cartesian position of each robot, including positions prescribed during interpolation, which comprises both location and orientation of each robot's TCP, is split into two parts. The DOF constrained by the trajectory and the tooling between the robot and the part are solved so that the constrains are met. The remaining unconstrained DOF are deviated from the prescribed position, so that the robot can reach the farthest possible along a given trajectory.

This algorithm can be used as a new inverse solution method in single robot applications, where load orientation is not important, and it can be used in multi-robot load sharing, where load orientation can be fixed by only the location of the sharing robot TCPs, and the orientation of each robot TCP is free in one or more DOF based on the tooling type.

An example of a single robot application would be, as said, part transfer to bins or conveyors.

For load sharing, the new inverse solution is used to support a new method for a dependent robot to follow an independent one. The terms "dependent" and "independent" refer to robots in geometrically coordinated motions, such as in load sharing as described in U.S. patent application Ser. No. 10/406,521 of Stoddard et al. filed on Apr. 3, 2003. In this case, the actual position of the shared part is based on the prescribed position of the independent robot. The location of the dependent robots is determined in the normal way, based on this prescribed position of the shared part. However, the orientation of all robots TCPs sharing the load, including both independent and dependent robots, is determined according to the new inverse solution method. This technique is used with any standard Cartesion interpolation type that interpolates all Cartesian DOF (x, y, z, A, B, C), for example linear and circular interpolation.

The inventive algorithm for determining the orientation of each robot sharing the load is called a "minimum extension" solution. By minimizing the distance from the base of the robot to its Wrist Center Point (WCP) for each point along a trajectory, the WCP is permitted to go farther along the trajectory, thus maximizing the working volume. This minimum extension approach can be used for the WCP, because a particular orientation has not be satisfied. That is, for each point along the trajestory, the orientation of the Tool Center Point (TCP) is permitted to change such that the WCP is closer to the robot base than if the specified orientation were used. The algorithm finds a solution that:
1) achieves the desired TCP location (x, y, z of the TCP),
2) uses the orientation such that the WCP is closest to the center of rotation at the robot base. The minimum extension algorithm varies based on the number of DOF relaxed by the tooling and based on the robot design. We will discuss here algorithm that work for three types of tooling and assuming a robot with a spherical wrist and with no wrist offsets or base/forearm offset. Solution for other types of robots and for other types of tooling are also possible.

BRIEF DESCRIPTION OF DRAWINGS

Further advantages and features of the invention can be gathered from the claims and the following description of embodiments of the invention with reference to the drawings. Herein show:

FIG. 2a a ball and socket joint, which permits rotation in all 3 rotational DOF;

FIG. 2b a hinge, which permits rotation in 1 DOF;

FIG. 2c a universal joint which points rotation in 2 DOF;

FIG. 6a, b a comparison of standard interpolation (FIG. 6a) with minimum extension interpolation (FIG. 6b) for a ball and socket joint;

FIG. 7a-d a comparison of standard interpolation with minimum extension interpolation for a hinge.

DETAILED DESCRIPTION OF INVENTION

Figure 1:
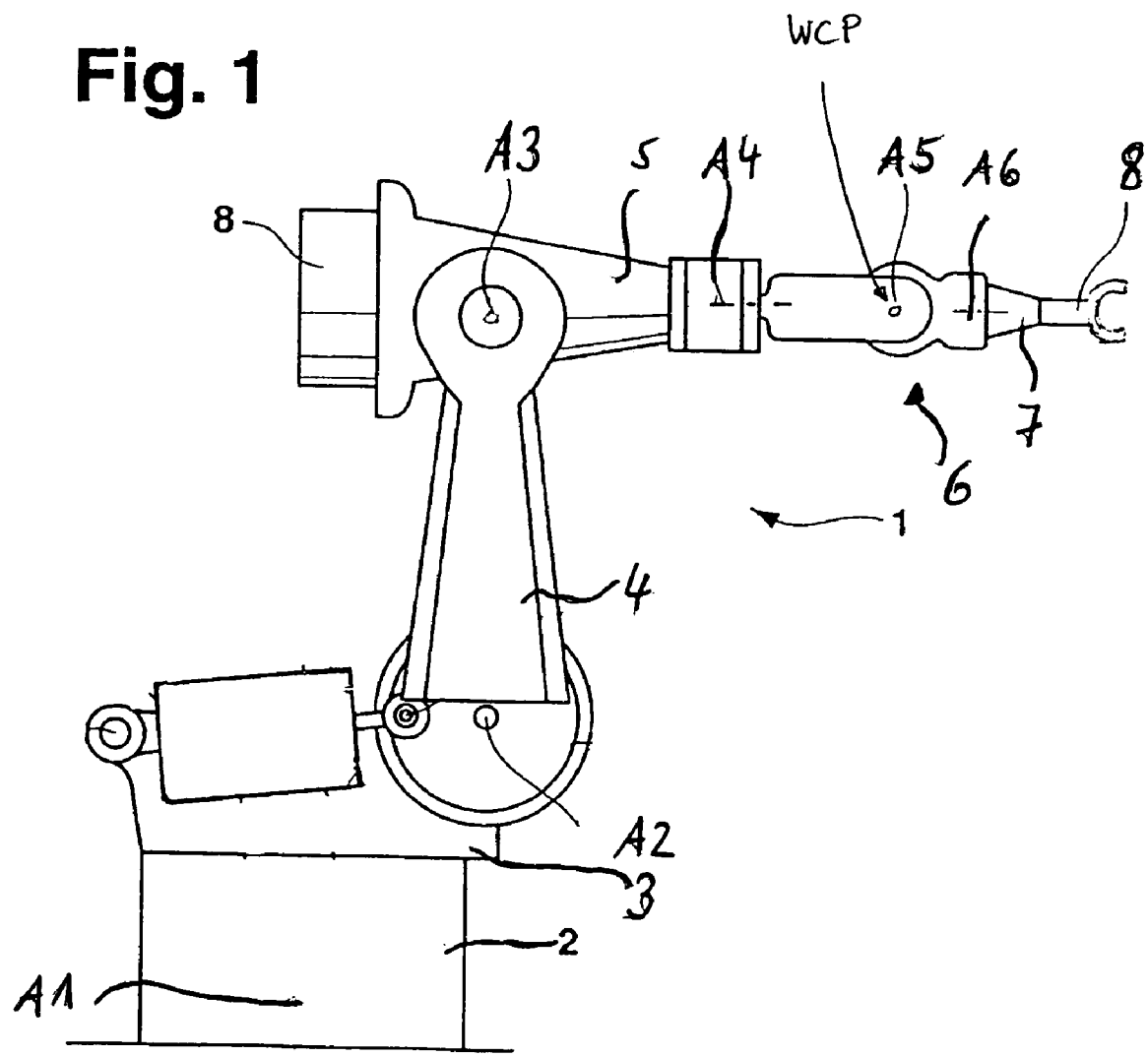
FIG. 1 an industrial robot with to which the invention applies.

An inventive industrial robot according has a fixed base 2 carrying a roundabout 3 pivotable about a vertical A1-axis. A first robot arm 4 is pivotably about a horizontal A2-axis connected with the roundabout 3.

The first robot arm 3 carries, pivotable about an horizontal A3-axis a second robot arm 5. The arm 5 has attached to it a robot hand 6, having three parts each of them being pivotable about an axis A4, A5, and A6, respectively. The axes intersect at the axis A5, which is the wrist center point (WCP) for this particular robot design. The free end of the hand part 7 (pivotable about the A6-axis) is provided with a tool 8, in this embodiment of the invention with a socket of a ball-socket-joint.

When a workpiece is carried by a single industrial robot a gripper is used that constrains the part in 6 DOF (x, y, z location and rotations about x, y, z).

Figure 2A:
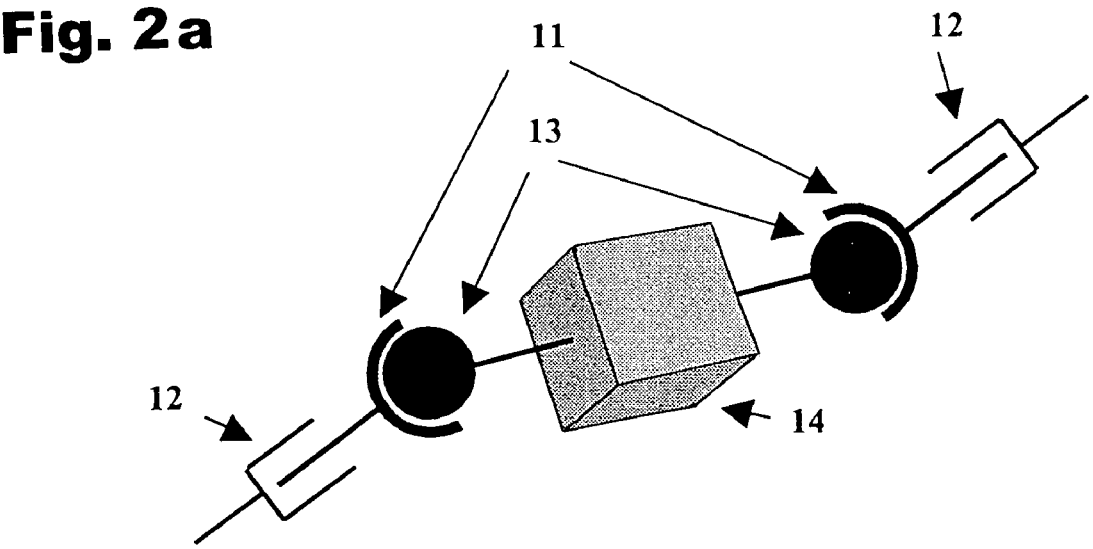
FIGS. 2a-2c various types of tooling with different free DOFs; namely

FIG. 2a shows attachment to a part 14 by a ball-and-socket joint with e.g. a socket 11 connected to the robot by a robot hand 12 and a ball 13 connected to the part 14.

Then the TCP, the center of the socket 11 is fixed in position (location and orientation) by the robot. The ball 13 is free to move around in 3 DOF of rotation. That is the part 14 can be freely rotated around the center of the ball 13 in 3 DOF. This tooling is said to constrain only location. (It constrains 0 DOF of orientation.)

If two balls 13 are placed on the part 14 (as shown in FIG. 2a), widely separated, and two robots are used to grasp the part, each with a socket 11 at one of the balls 13, then the part 14 is still free to rotate about a line between the two balls 13. To fix the orientation of the part by using only balls 13 and sockets 11 for the attachment devices, at least three robots must be used to carry the part. This may be useful in some cases, but a solution would be preferable that works using only two robots to carry the part 14.

Figure 2B:
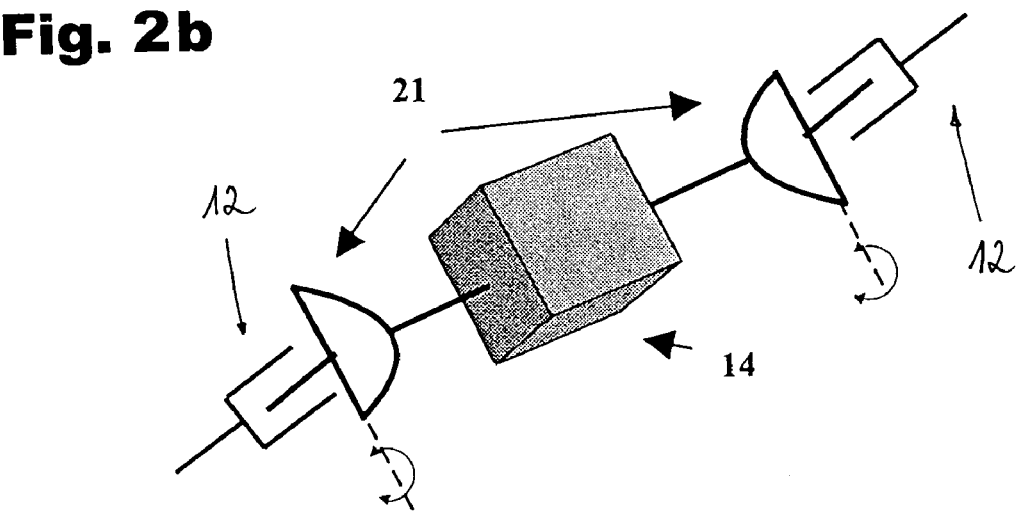

According to FIG. 2b a part 14 is carried by an axle or hinge 21 mounted on each side of the part 14. If one robot picks up the part 14 by gripping one hinge 21, the part 14 can now move around in only 1 DOF as it can only rotate about the hinge axis. This tooling constrains location AND 2 DOF of orientation. Now if two robots pick up the part, each by gripping one hinge 21, the orientation of the part 14 is fixed; it is over-constrained in some DOF, but not in the DOF freed by the hinges 21.

Figure 2C:
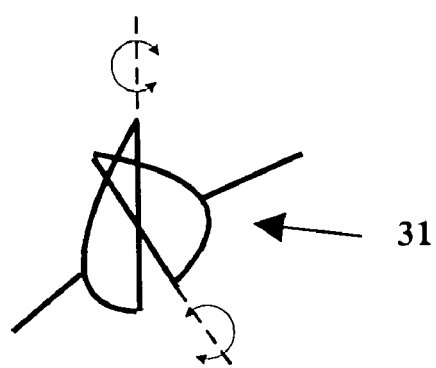

A third type of tooling is a form of universal joint 31 shown in FIG. 2c, which permits rotation in 2 DOF and stops or constrains rotation in the $3^{rd}$ DOF as the combination of two axes or hinges each rotatable about axes with different orientations. A part with a U-joint on each side could also be carried by two robots, further improving the over-constrained situation.

Figure 3:
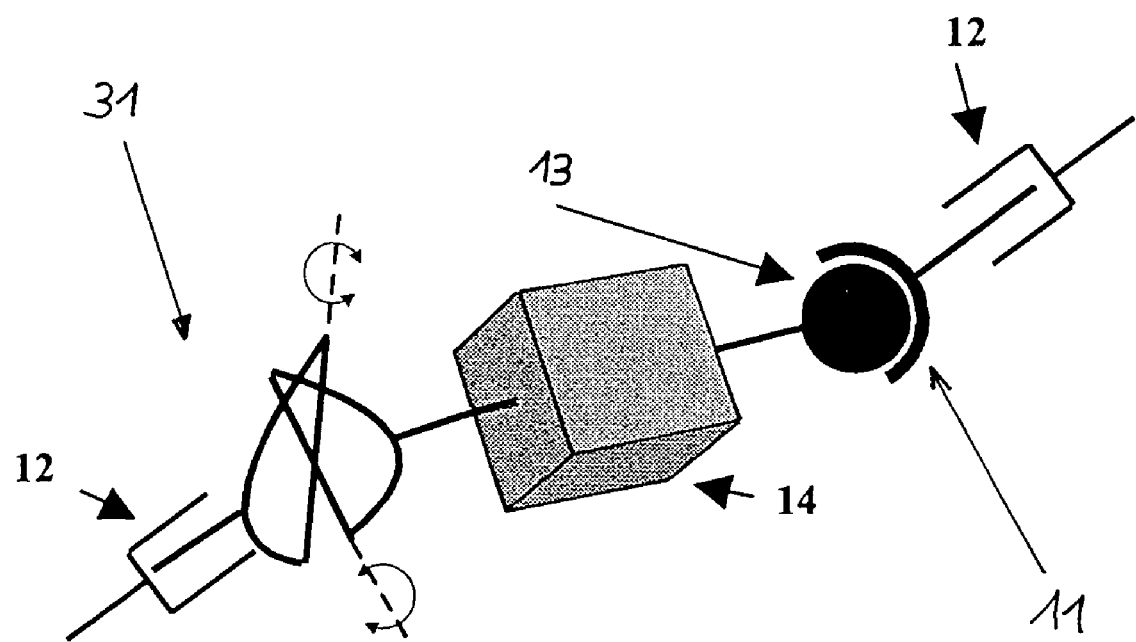
FIG. 3 a shared load between two robots, with different types of attachment tooling.

As shown in FIG. 3, a combination of tooling types can be used. For example, if one robot (not shown) grips the part 14 via a universal joint 31, and the other robot (not shown) grips via a ball and socket 13, then a third robot is not needed. The robot gripping by the U-joint 31 constrains the rotation about a line between the U-joint 31 and the ball 13, while the other two rotations of the part are constrained by the location of the grip points, and none of the three rotations are over-constrained.

During normal interpolation in the prior art, a trajectory is interpolated in all 6 DOF. When load sharing with two or more robots normally one independent robot and one or more dependent robots are used. These terms refer to robots in geometrically coordinated motions, such as in load sharing, as described in U.S. patent application Ser. No. 10/406,521 of Stoddart et al. filed on Apr. 3, 2003, where one robot, the independent one, follows its normal interpolation methods, while other dependent robots move in coordinate systems relative to one that is "dependent" on and attached to the independent robot, any dependent robot linked to an independent robot simply copies the full 6 DOF position, offsets it from the independent grip point to the dependent grip point, then solves for its 6 joint angles using the same 6 DOF algorithm as the independent robot. These solutions are all done in the same servo cycle and output the joint angles of all robots in the same servo cycle, one solution being output for each interpolation cycle for each robot.

According to the invention using "extension minimization", the independent robot will interpolate the full trajectory, as normal, and communicate all 6 DOF of Cartesian information to all dependent robots, as normal in the prior art for example according to the above mentioned U.S. patent application Ser. No. 10/406,521. Even though each robot will ignore this interpolated orientation in its final solution, the orientation is important in determining the correct offset of each robot's grip point relative to the independent robot's grip point.

The final solution of the TCP of each robot (independent and all dependent robots) is done by solving for the location of the TCP specified by the interpolator of the independent robot and offset for the dependent robots (or communicated and offset link information). However, for the orientation of each TCP (including the independent robot), we substitute optimized orientation information for that coming derived from the standard interpolator or link information with the orientation derived from the minimum extent algorithm.

For the ball and socket tooling, which imposes no orientation constraints, an optimized orientation is one that causes little or no wrist joint angle change from the previous interpolated value AND that places the Wrist Center Point (WCP) as near the base axes intersection as possible. There will generally be multiple sets of wrist joint angles that satisfy the last criterion, and so the first criterion forces picking the minimum motion set that would cause minimum motion of the wrist joints from the previously interpolated values.

Following is the detailed step by step algorithm applied to 6 DOF open link kinematic chain robots whose wrists do not have an offset, and whose WCP solution can be done independently from its wrist axes solution (a spherical wrist.) There may be offsets in the base; the algorithm is the same whether or not there is a base offset.

First is the algorithm for minimum extension when orientation is free in all 3 DOF as imposed by the ball and socket model for tooling OR when orientation is free in 2 DOF as imposed by the universal joint model for tooling.

Figure 4A:
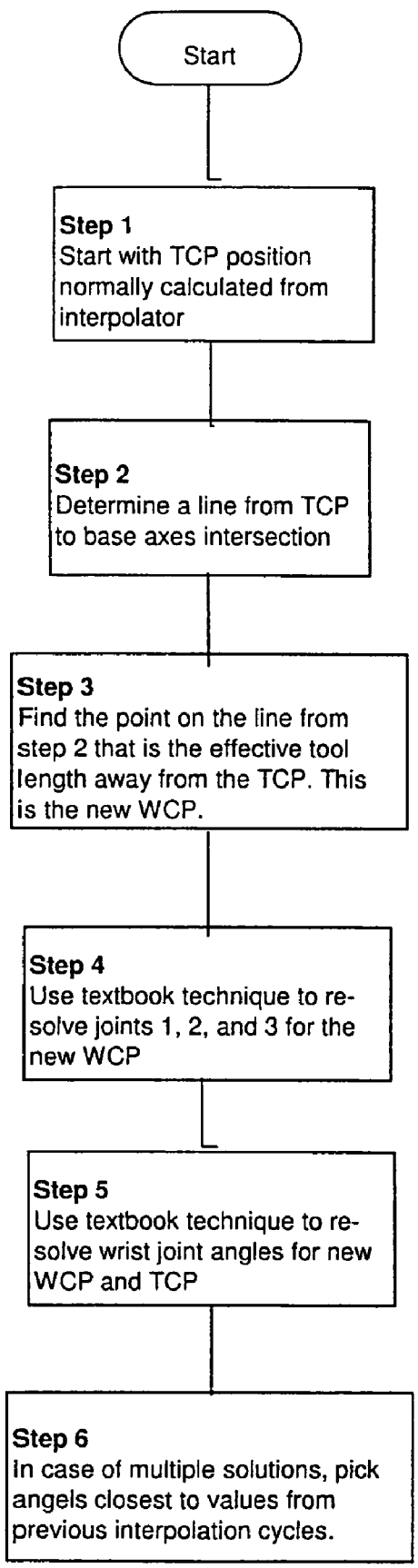
FIG. 4a a flowchart for inventive algorithm for 2 or 3 DOF.
Figure 4B:
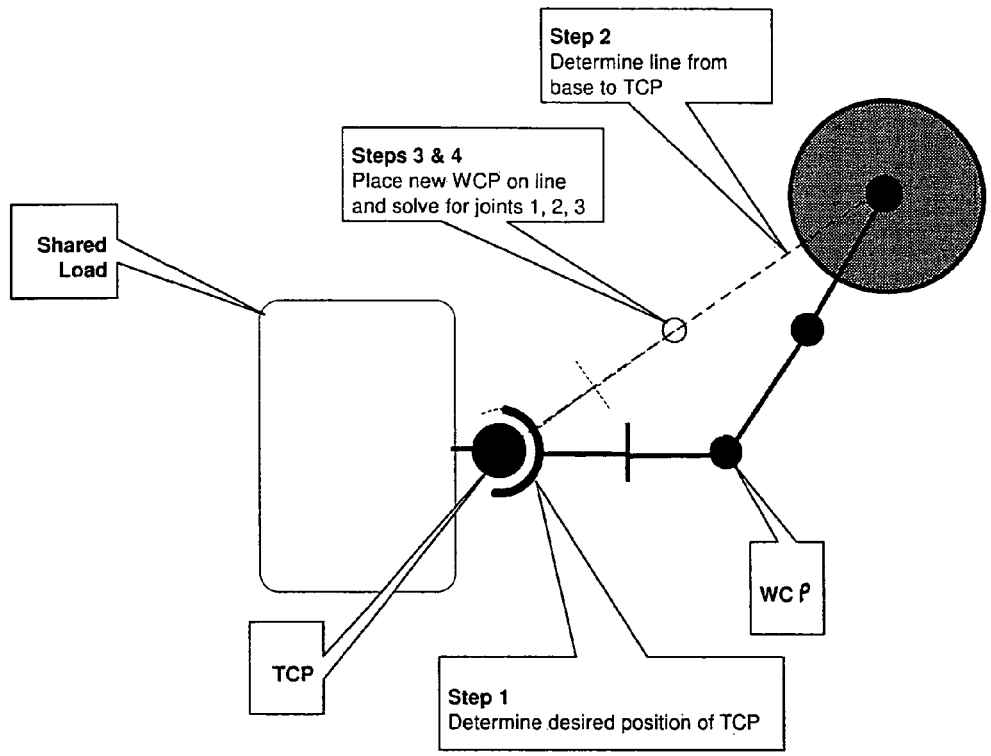
FIG. 4b, c the minimum extension algorithm for 2 or 3 DOF pictorially.
Figure 4C:
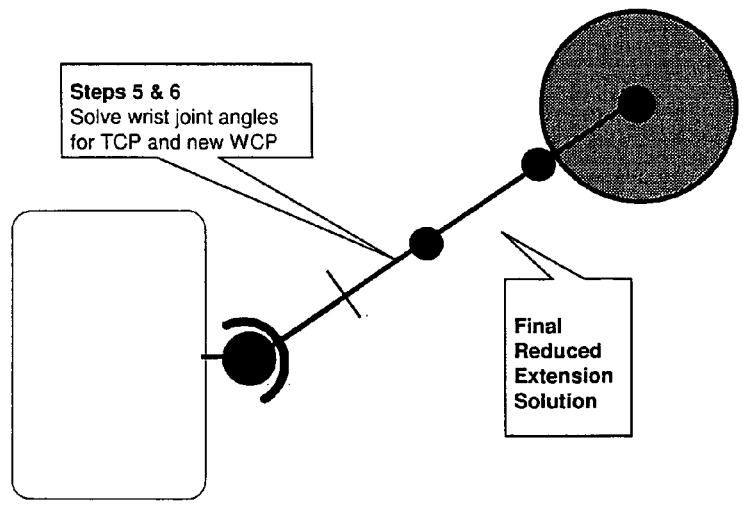

The solution is shown in FIGS. 4a-4c and is carried out as follows:

Step 1: Start with position (both location and orientation) of TCP from interpolator or other prescribed position;

Step 2: Find the line from the intersection of the base axis of rotation with the $2^{nd}$ joint axis of rotation the "base intersection", to the TCP; (This is true even when there is an offset between the base axis of rotation and the plane of motion of links 2 and 3 (an offset base).)

Step 3: Find the point on that line that is exactly the TCP-WCP distance from the TCP (the effective tool length). This point is the location of the new WCP;

Step 4: Determine robot joints 1, 2, and 3 for above identified WCP, as in the standard solution for the WCP as defined in any text book showing robotic kinematic inverse solutions;

Step 5: Find the robot wrist joint angles that properly locate the TCP relative to the identified WCP. This will leave one DOF of rotation free about the line from the WCP to the TCP. However, in practice a socket is not truly free to rotate fully about a ball, and the actual tooling constraint can help to determine this final rotation. For a U-joint, the final rotation is fixed by the fixed rotation of the U-joint. For the U-joint, this final rotation is dictated by the U-joint orientation relative to the fixture or load being carried. For the ball and socket, this final rotation is also free and should be chosen to be near to or the same as its value from previous interpolation cycles.

Step 6: If there are multiple solutions in the first four steps, pick the wrist robot joint angles closest to values from previous interpolation cycles.

Figure 5A:
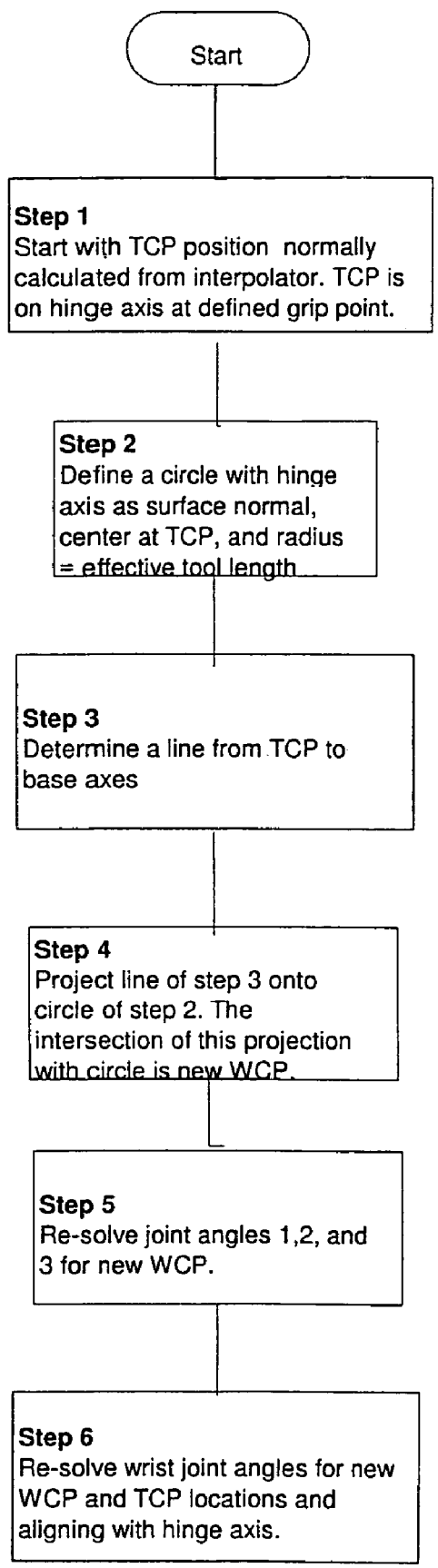
FIG. 5a a flowchart for the inventive algorithm for 1 DOF.
Figure 5B:
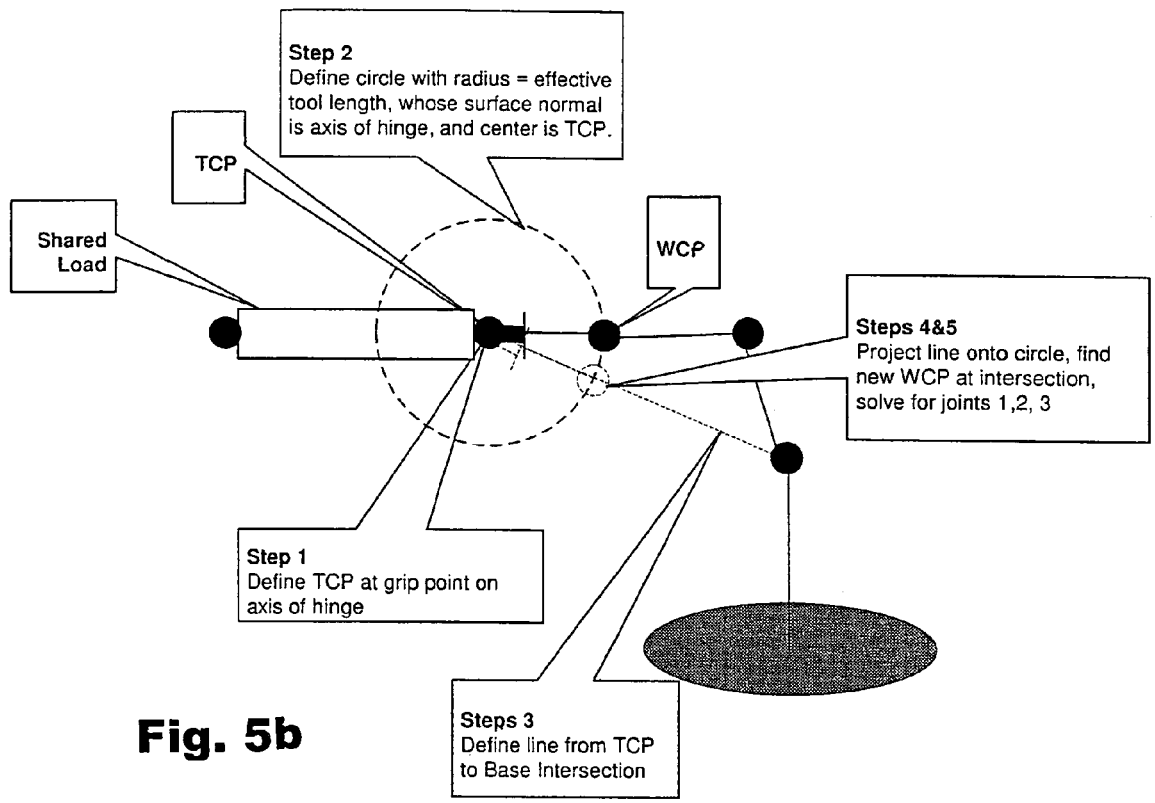
FIG. 5b, c the minimum extension algorithm for 1 DOF pictorially.
Figure 5C:
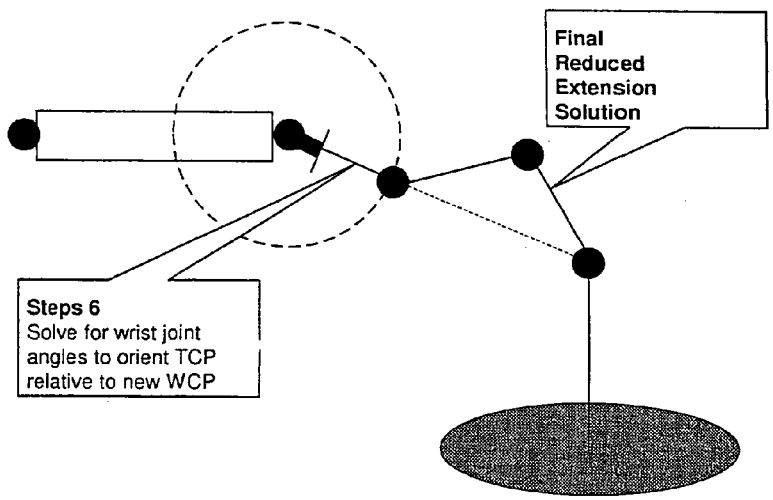

Following is the algorithm according to FIGS. 5*a-c*, assuming only 1 DOF of orientation is free, as imposed by a hinge model for tooling:

Step 1: Define the TCP to be on the axis of the hinge, located at the defined grip point along the hinge axis.

Step 2: Define a circle whose center point is the TCP and the plane of which is defined by the hinge axis. The radius of the circle is defined by the TCP to WCP distance (effective tool length.)

Step 3: Find the line from the robot base intersection to the TCP as in the ball and socket case.

Step 4: Project the above line onto the plane of the circle defined above.

Step 5: The intersection of the circle with the projected line is the desired location of the WCP. It represents the intersection of the circle with the smallest possible sphere about the robot base intersection (the minimum extension of the WCP that touches the circle.) Solve for (determine) robot joints 1, 2, and 3 as in the ball and socket case (standard textbook solution).

Step 6: Solve for the wrist joint angles that properly locate the TCP relative to the WCP. This will leave one rotation free, which can be fixed by the direction of the hinge axis.

With proper tool mounting, using the above two solutions for hinges, and U-joints, and/or ball-and-socket tooling for each point along a trajectory will also avoid wrist singularities along the trajectory.

FIGS. 6*a* and 6*b* show a comparision of raising a part, here a car, using a rigid gripper (FIG. 6*a*) raising the car using ball and socket attachments along with the minimum extension algorithm (FIG. 6*b*). The car is carried in a vertical line from a low position to a high position. With interpolation using a rigid gripper and standard inverse solution (FIG. 6*a*), the reach is limited, because the orientation must always match the car carrier (horizontal). In addition, the wrist must go near a singularity. With inverse solution attachment using a ball and socket along with minimum extension, the wrist stays in line with the robot base intersection and never goes near a singularity except at the extreme limits of reachability, and accordingly does not encounter any problem. The reach is extended, since the wrist does not have to remain horizontal.

FIGS. 7*a* through 7*d* show a comparison of standard inverse solution transporting a part, e.g. a car, by a rigid gripper versus minimum extension inverse solution using hinge attachments between the robot and car carrier. FIGS. 7*a* and 7*c* show top views whereas FIGS. 7*b* and 7*d* shows end views. The wrist is more constrained than with the ball and socket, but this can realistically be used with two robot sharing. This diagram shows top and end views of the same horizontal motion. It is shown at a height that would give the standard inverse solution a problem, as it must go near a singularity. There is no such problem with the minimum extension inverse solution, except at the very extremes. There is also and increase in reach for the minimum extension over standard inverse solution, because the wrist center point is lower at the extremes.

The invention claimed is:

1. A method for controlling a robot during an interpolation of a trajectory or motion to any prescribed position, comprising the steps:
    a) ignoring at least one of the three originally prescribed or interpolated tool center point orientation values,
    b) finding new tool center point orientation values that place the wrist center point of the robot closest to its base while
    c) maintaining the originally prescribed or interpolated tool center point location values and
    d) maintaining the original prescribed or interpolated tool center point orientation values not ignored.

2. Method according to claim 1, wherein step b) is done by an extent minimization algorithm.

3. Method according to claim 1, wherein the orientation remains of the tool center point constrained in two degrees of freedom, but is free to rotate about a single axis, such that the free axis can be ignored according to said step a).

4. Method according to claim 1, wherein the orientation of the tool center point is constrained in 1 degree of freedom, but is free to rotate about two axes, such that the free axes can be ignored according to said step a).

5. Method according to claim 1, wherein in the orientation of the tool center point is free to rotate about all three axes, such that the free axes can be ignored according to said step a).

6. Method according to claim 1, including carrying a load with at least two robots, such that an attachment of at least one robot to the load is via a universal joint.

7. Method according to claim 1, wherein an attachment of at least one robot to the load is via a hinge joint.

8. Method according to claim 1, wherein an attachment of at least one robot to the load is via a ball and a socket joint.

9. Method according to claim 1, wherein controlling at least one of said robots during interpolation of a trajectory comprises:
    a) ignoring at least one of the three originally prescribed or interpolated tool center point orientation values,
    b) finding new tool center point orientation values that place the wrist center point of the robot closest to its base while
    c) maintaining the originally prescribed or interpolated tool center point location values and
    d) maintaining the original prescribed or interpolated tool center point orientation values not ignored.

10. A system for controlling a robot for use during an interpolation of a trajectory or motion to any prescribed position, being designed
    a) to ignore at least one of the three originally prescribed or interpolated tool center point orientation values,
    b) to find new tool center point orientation values that place the wrist center point of the robot closest to its base while
    c) maintaining the originally prescribed or interpolated tool center point location values and
    d) maintaining the original prescribed or interpolated tool center point orientation values not ignored.

11. System according to claim 10 including an extent minimization algorithm for determining new tool center point orientation values.

12. System according to claim 10, wherein the orientation of the tool center point remains constrained in 2 DOF, but is free to rotate about a single axis, such that the free axis can be ignored according to said step a).

13. System according to claim 10, wherein the orientation of the tool center point is constrained in 1 DOF, but is free to rotate about two axes, such that the free axes can be ignored according to said step a).

14. System according to claim 10, wherein the orientation is free to rotate about all three axes, such that the free axes can be ignored according to said step a).

15. System according to claim 10, wherein the system includes at least two robots, carrying a load, wherein an attachment of at least one robot to the load is via a universal joint.

16. System according to claim 10, wherein an attachment of at least one robot to the load is via a ball and socket joint.

17. System according to claim 10, wherein an attachment of at least one robot to the load is via a hinge.

18. System according to claim 10, wherein an attachment of at least one robot to the load is via a universal joint and wherein at least one of said robots comprises a control system for use during an interpolation of a trajectory or motion to any prescribed position, said control system being designed
   a) to ignore at least one of the three originally prescribed or interpolated tool center point orientation values,
   b) to find new tool center point orientation values that place the wrist center point of the robot closest to its base while
   c) maintaining the originally prescribed or interpolated tool center point location values and
   d) maintaining the original prescribed or interpolated tool center point orientation values not ignored.

* * * * *